United States Patent
Kumano et al.

(10) Patent No.: US 11,157,751 B2
(45) Date of Patent: Oct. 26, 2021

(54) TRAFFIC GUIDE OBJECT RECOGNITION DEVICE, TRAFFIC GUIDE OBJECT RECOGNITION METHOD, AND STORAGE MEDIUM

(71) Applicant: HONDA MOTOR CO., LTD., Tokyo (JP)

(72) Inventors: Takayasu Kumano, Wako (JP); Takuya Niioka, Wako (JP); Kazuma Ohara, Wako (JP); Suguru Yanagihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 16/681,855

(22) Filed: Nov. 13, 2019

(65) Prior Publication Data

US 2020/0167574 A1 May 28, 2020

(30) Foreign Application Priority Data

Nov. 27, 2018 (JP) .............................. JP2018-22103 8

(51) Int. Cl.
| | | |
|---|---|---|
| G06K 9/00 | (2006.01) | |
| G08G 1/095 | (2006.01) | |
| G08G 1/16 | (2006.01) | |
| B60R 1/12 | (2006.01) | |
| B60R 11/04 | (2006.01) | |

(52) U.S. Cl.
CPC ............ *G06K 9/00791* (2013.01); *B60R 1/12* (2013.01); *B60R 11/04* (2013.01); *G08G 1/095* (2013.01); *G08G 1/166* (2013.01)

(58) Field of Classification Search
CPC .............................. B60W 30/00; B60W 60/00
See application file for complete search history.

(56) References Cited

U.S. PATENT DOCUMENTS

2016/0318490 A1* 11/2016 Ben Shalom ............. B60T 7/18
2017/0270378 A1 9/2017 Guan

FOREIGN PATENT DOCUMENTS

| CN | 105074794 | 11/2015 |
|---|---|---|
| JP | 2007-034693 | 2/2007 |
| JP | 2015-076006 | 4/2015 |
| JP | 2016-143324 | 8/2016 |
| JP | 2017-102665 | 6/2017 |

OTHER PUBLICATIONS

Japanese Office Action for Japanese Patent Application No. 2018-221038 dated Sep. 15, 2020.
Chinese Office Action for Chinese Patent Application No. 201911153982.7 dated Aug. 17, 2021.

* cited by examiner

*Primary Examiner* — Kyle M Lotfi
(74) *Attorney, Agent, or Firm* — Amin, Turocy & Watson, LLP

(57) ABSTRACT

A traffic guide object recognition device includes an imager configured to image surroundings of a vehicle and a recognizer configured to recognize surrounding circumstances of the vehicle. The recognizer selects a traffic guide object which the vehicle is to follow on the basis of forms of traffic guide objects in an image captured by the imager out of traffic guide objects which are provided near the vehicle.

10 Claims, 12 Drawing Sheets

TRAFFIC GUIDE OBJECT RECOGNITION DEVICE, TRAFFIC GUIDE OBJECT RECOGNITION METHOD, AND STORAGE MEDIUM

CROSS-REFERENCE TO RELATED APPLICATION

Priority is claimed on Japanese Patent Application No. 2018-221038, filed Nov. 27, 2018, the content of which is incorporated herein by reference.

BACKGROUND

Field of the Invention

The invention relates to a traffic guide object recognition device, a traffic guide object recognition method, and a storage medium.

Description of Related Art

In the related art, a technique of controlling a vehicle such that an unnecessary process of determining a possibility of collision is not performed or recognizing a type of a road sign in a traveling direction of a vehicle from image data and giving an alarm to an occupant based on the recognized type of the road sign when a traffic signal is provided at a crossing in front of the vehicle is known (for example, Japanese Unexamined Patent Application, First Publication No. 2015-76006 and Japanese Unexamined Patent Application, First Publication No. 2017-102665).

SUMMARY

However, a traffic guide object may not be accurately recognized depending on circumstances of a road such as an anomalous crossing at which roads are not orthogonal or a road in which different traffic guide objects are provided for a plurality of lanes.

An aspect of the invention is made in consideration of the above-mentioned circumstances and an objective thereof is to provide a traffic guide object recognition device, a traffic guide object recognition method, and a storage medium that can improve recognition accuracy of a traffic guide object.

A traffic guide object recognition device, a traffic guide object recognition method, and a storage medium according to the invention employ the following configurations.

(1) According to an aspect of the invention, there is provided a traffic guide object recognition device including: an imager configured to image surroundings of a vehicle; and a recognizer configured to recognize surrounding circumstances of the vehicle, wherein the recognizer selects a traffic guide object which the vehicle is to follow on the basis of forms of traffic guide objects in an image captured by the imager out of traffic guide objects which are provided near the vehicle.

(2) In the aspect of (1), the recognizer may recognize the traffic guide objects which are provided near the vehicle on the basis of the image captured by the imager, derive directions of the traffic guide objects on the basis of aspect ratios of image areas which are recognized to be occupied by shapes or feature areas of the recognized traffic guide objects, and select the traffic guide object which the vehicle is to follow on the basis of the derived directions.

(3) In the aspect of (1), the recognizer may derive the directions of the traffic guide objects on the basis of a direction in which markings for defining a lane in which the vehicle travels extend.

(4) In the aspect of (1), the recognizer may acquire map information near the vehicle, recognize directions of the traffic guide objects which are provided in front of the vehicle from the acquired map information, and select the traffic guide object which the vehicle is to follow on the basis of the recognized directions.

(5) In the aspect of (1), the recognizer may select a traffic guide object from which a distance to the vehicle is short as the traffic guide object which the vehicle is to follow when a plurality of traffic guide objects are recognized.

(6) In the aspect of (1), the traffic guide objects may include a traffic signal including a first light emitter that emits light of a color for permitting traveling of the vehicle and a second light emitter that emits light of a color for prohibiting traveling of the vehicle.

(7) In the aspect of (6), the recognizer may derive a direction of the traffic signal on the basis of an aspect ratio of an image area which is recognized to be occupied by the first light emitter or an image area which is recognized to be occupied by the second light emitter, and select a traffic signal which the vehicle is to follow on the basis of the derived direction.

(8) In the aspect of (6), the recognizer may derive a direction of the traffic signal on the basis of an area ratio of an image area which is recognized to be occupied by the first light emitter and an image area which is recognized to be occupied by the second light emitter when the first light emitter and the second light emitter of the traffic signal are horizontally arranged, and select the traffic signal which the vehicle is to follow on the basis of the derived direction.

(9) In the aspect of (6), the traffic signal may further include a hood portion which is provided above the first light emitter and the second light emitter and protrudes to emission destinations of the first light emitter and the second light emitter, and the recognizer may derive a direction of the traffic signal on the basis of degrees of shielding of an image area which is recognized to be occupied by the first light emitter or an image area which is recognized to be occupied by the second light emitter by the hood portion and select the traffic signal which the vehicle is to follow on the basis of the derived direction.

(10) In the aspect of (9), the recognizer may derive the degrees of shielding by the hood portion on the basis of an area ratio between right and left of the image area which is recognized to be occupied by the first light emitter or the image area which is recognized to be occupied by the second light emitter.

(11) According to another aspect of the invention, there is provided a traffic guide object recognition method causing a computer to perform: recognizing surrounding circumstances of a vehicle; and selecting a traffic guide object which the vehicle is to follow on the basis of forms of traffic guide objects in an image captured by an imager configured to image surroundings of the vehicle out of traffic guide objects which are provided near the vehicle.

(12) According to still another aspect of the invention, there is provided a non-transitory computer-readable storage medium having a program stored, the program causing a computer to perform: recognizing surrounding circumstances of a vehicle; and selecting a traffic guide object which the vehicle is to follow on the basis of forms of traffic guide objects in an image captured by an imager configured to image surroundings of the vehicle out of traffic guide objects which are provided near the vehicle.

According to the aspects of (1) to (12), it is possible to improve recognition accuracy of a traffic guide object.

DESCRIPTION OF EMBODIMENTS

DESCRIPTION OF EMBODIMENTS

Hereinafter, a traffic guide object recognition device, a traffic guide object recognition method, and a storage medium according to an embodiment of the invention will be described with reference to the accompanying drawings. In the following description, it is assumed that the traffic guide object recognition device is applied to a vehicle which is driven by automated driving. Automated driving is, for example, to execute driving control by controlling one or both of steering and acceleration/deceleration of a vehicle. This driving control includes control for supporting driving by an occupant (a driving support function) such as an adaptive cruise control system (ACC), a lane keeping assistance system (LKAS), or a collision mitigation brake system (CMBS). In the following description, it is assumed that the rule of driving on the left-hand side is applied, but right and left may be exchanged with each other when the rule of driving on the right-hand side is applied.

Entire Configuration

Figure 1:
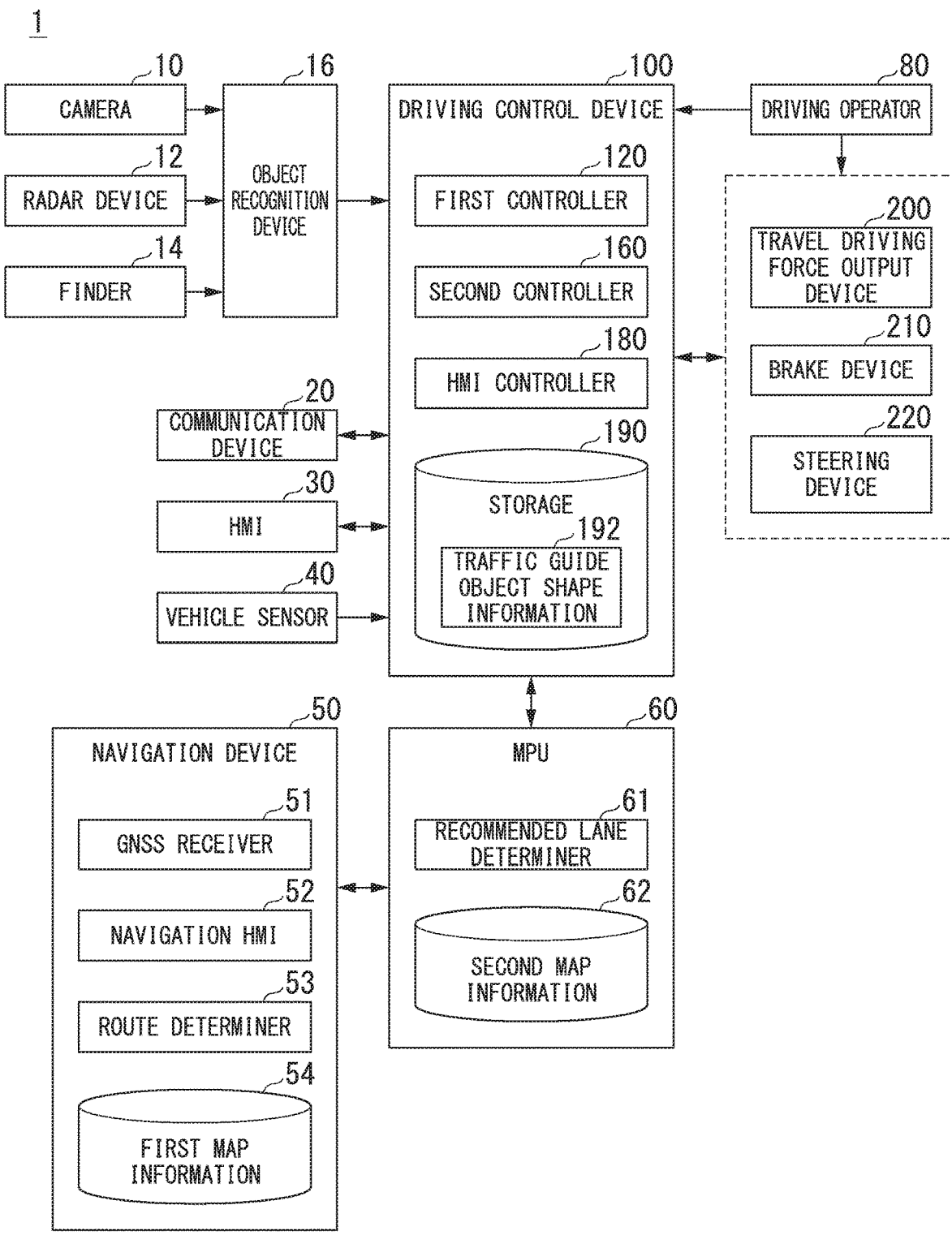
FIG. 1 is a diagram showing a configuration of a vehicle system to which an object recognition device according to an embodiment is applied.

FIG. 1 is a diagram showing a configuration of a vehicle system 1 to which an object recognition device according to an embodiment is applied. A vehicle (hereinafter referred to as a vehicle M) in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a secondary battery or a fuel cell.

The vehicle system 1 includes, for example, a camera (an example of an imager) 10, a radar device 12, a finder 14, an object recognization device 16, a communication device 20, a human-machine interface (HMI) 30, a vehicle sensor 40, a navigation device 50, a map positioning unit (MPU) 60, a driving operator 80, a driving control device 100, a travel driving force output device 200, a brake device 210, and a steering device 220. These devices or units are connected to each other via a multiplex communication line such as a controller area network (CAN) communication line, a serial communication line, a radio communication network, or the like. The configuration shown in FIG. 1 is only an example and a part of the configuration may be omitted or another configuration may be added thereto. A combination of the camera 10, the radar device 12, the finder 14, the object recognition device 16, and a recognizer 130 which will be described later is an example of a "traffic guide object recognition device."

The camera 10 is, for example, a digital camera using a solid-state imaging device such as a charge coupled device (CCD) or a complementary metal oxide semiconductor (CMOS). The camera 10 is attached to an arbitrary position on the vehicle M. For example, when the front of the vehicle M is imaged, the camera 10 is attached to an upper part of a front windshield, a rear surface of a rearview mirror, or the like. The camera 10 images surroundings of the vehicle M, for example, periodically and repeatedly. The camera 10 may be a stereoscopic camera.

The radar device 12 radiates radio waves such as millimeter waves to the surroundings of the vehicle M, detects radio waves (reflected waves) reflected by an object included in a radiation range, and detects at least a position (a distance and a direction) of the object. The radar device 12 is attached to an arbitrary position on the vehicle M. The radar device 12 may detect a position and a speed of an object using a frequency modulated continuous wave (FM-CW) method.

The finder 14 is a Light Detection And Ranging device (LIDAR). The finder 14 applies light to the surroundings of the vehicle M and measures scattered light. The finder 14 detects a distance to an object on the basis of a time from emission of light to reception of light. The light which is applied is, for example, a pulse-like laser beam. The finder 14 is attached to an arbitrary position on the vehicle M.

The object recognition device 16 performs a sensor fusion process on results of detection from some or all of the camera 10, the radar device 12, and the finder 14 and recognizes a position, a type, a speed, and the like of an object. The object recognition device 16 outputs the result of recognition to the driving control device 100. The object recognition device 16 may output the results of detection from the camera 10, the radar device 12, and the finder 14 to the driving control device 100 without any change. The object recognition device 16 may be omitted from the vehicle system 1. The camera 10 includes an infrared camera that images change of a surface temperature of an object in addition to a camera that captures a normal image. The imaging may be switched between normal imaging and infrared imaging by a function which is provided in the camera 10.

The communication device 20 communicates with another vehicle near the vehicle M, for example, using a cellular network, a Wi-Fi network, or Bluetooth (registered trademark), dedicated short range communication (DSRC) or communicates with various server devices via a radio base station.

The HMI 30 presents a variety of information to an occupant of the vehicle M and receives an input operation from the occupant. The HMI 30 includes various display devices, speakers, buzzers, touch panels, switches, keys, and light emitting devices that are provided inside the vehicle M. A part of the configuration of the HMI 30 may be provided in the driving operator 80 (for example, a steering wheel).

The vehicle sensor 40 includes a vehicle speed sensor that detects a speed of the vehicle M, an acceleration sensor that detects acceleration, a yaw rate sensor that detects an angular velocity around a vertical axis, and a direction sensor that detects a direction of the vehicle M. The acceleration includes, for example, at least one of a longitudinal acceleration in the traveling direction of the vehicle M and a lateral acceleration in the lateral direction of the vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 specifies a position of the vehicle M on the basis of signals received from GNSS satellites. The position of the vehicle M may be specified or complemented by an inertial navigation system (INS) using the output of the vehicle sensor 40. The GNSS receiver 51 may be provided as the vehicle sensor 40.

The navigation HMI 52 includes a display device, a speaker, a touch panel, and keys. All or a part of the navigation HMI 52 may be shared by the HMI 30. For example, the route determiner 53 determines a route (hereinafter a route on a map) from a position of the vehicle M specified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include a curvature of a road or point of interest (POI) information. The route on a map is output to the MPU 60. The navigation device 50 may perform guidance for a route using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and may acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides the route on a map supplied from the navigation device 50 into a plurality of blocks (for example, every 100 [m] in a vehicle traveling direction) and determines a recommended lane for each block with reference to the second map information 62. The recommended lane determiner 61 determines in which lane from the leftmost the vehicle will travel. When there is a branching point in the route on a map, the recommended lane determiner 61 determines a recommended lane such that the vehicle M travels in a rational route for traveling to a branching destination.

The second map information 62 is map information with higher precision than the first map information 54. The second map information 62 includes, for example, information of the center of a lane or information of boundaries of a lane. The second map information 62 may include information such as the positions or number of traveling lanes based on a road shape, presence or absence of a crossing, a position of an overtaking lane, and merging/branching. The second map information 62 may include traffic guide objects, road information, traffic regulation information, address information (addresses and post numbers), facility information, and phone number information. The traffic guide objects include, for example, a traffic signal (hereinafter referred to as a signal) or a traffic sign. The second map information 62 may include information such as installation positions or front directions of the traffic guide objects in an absolute coordinate system on a map and types of traffic guide objects. The second map information 62 may be updated from time to time by communicating with another device using the communication device 20.

The driving operator 80 includes, for example, an accelerator pedal, a brake pedal, a shift lever, a steering wheel, a deformed steering, a joystick, and other operators. A sensor that detects an amount of operation or performing of an operation is attached to the driving operator 80, and results of detection thereof are output to some or all of the driving control device 100, the travel driving force output device 200, the brake device 210, and the steering device 220.

The driving control device 100 includes, for example, a first controller 120, a second controller 160, an HMI controller 180, and a storage 190. The elements other than the storage 190 are embodied by causing a hardware processor such as a central processing unit (CPU) to execute a program (software). Some or all of such elements may be embodied in hardware (which includes circuitry) such as a large scale integration (LSI), an application specific integrated circuit (ASIC), or a field-programmable gate array (FPGA), or a graphics processing unit (GPU) or may be embodied in cooperation of software and hardware. The program may be stored in the storage 190 of the driving control device 100 in advance, or may be installed in the storage 190 of the driving control device 100 by storing the program in a detachable storage medium (a non-transitory storage medium) such as a DVD or a CD-ROM and attaching the storage medium to a drive device.

Figure 2:
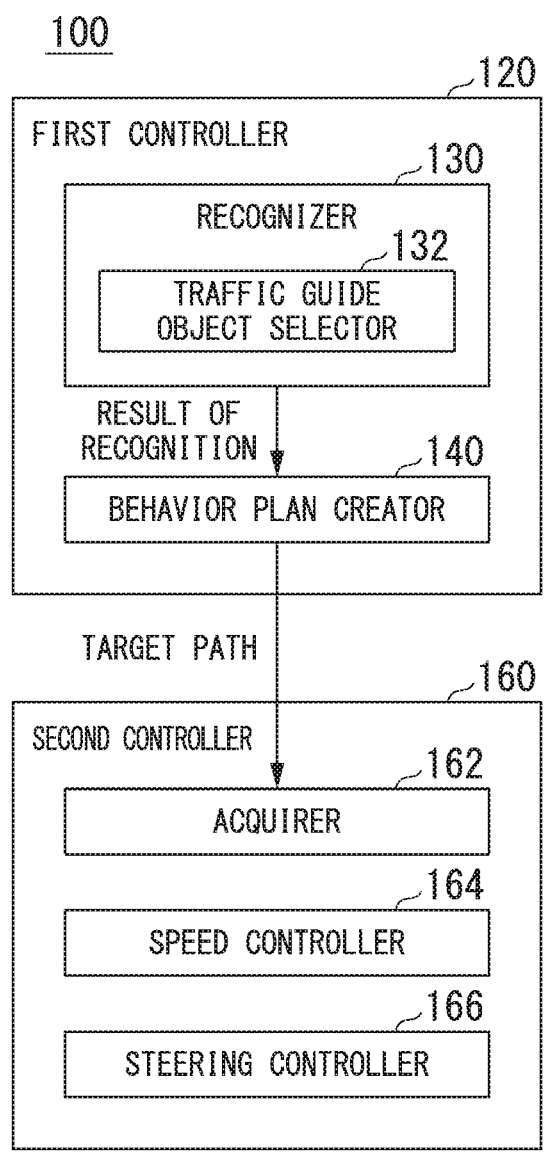
FIG. 2 is a diagram showing functional configurations of a first controller and a second controller.

FIG. 2 is a diagram showing functional configurations of the first controller 120 and the second controller 160. The first controller 120 includes, for example, a recognizer 130 and a behavior plan creator 140. A combination of the behavior plan creator 140 and the second controller 160 is an example of a "driving controller."

The first controller 120 is embodied, for example, using a function based on artificial intelligence (AI) and a function based on a predetermined model together. For example, a function of "recognizing a crossing" may be embodied by performing recognition of a crossing based on deep learning or the like and recognition based on predetermined conditions (such as signals which can be pattern-matched and road signs) in parallel, scoring both recognitions, and comprehensively evaluating both recognitions. Accordingly, reliability of automated driving is secured.

The recognizer 130 recognizes surrounding circumstances of the vehicle M, for example, on the basis of information input from the camera 10, the radar device 12, and the finder 14 via the object recognition device 16. For example, the recognizer 130 recognizes states such as a position, a direction, a speed, and an acceleration of an object which is located near the vehicle M. Examples of an object include a mobile object such as a pedestrian or another vehicle, an obstacle such as road work, a building such as a bridge, and a traffic guide object. Examples of a traffic sign which is a traffic guide object which is recognized herein includes a sign board indicating traffic regulations which is installed in the vicinity of a road, a temporary stop line drawn on a road surface (hereinafter referred to as a stop line), and other signs. A position of an object is recognized, for example, as a position in a relative coordinate system with an origin set to a representative point of the vehicle M (such as the center of gravity or the center of a drive shaft) and is used for control. A position of an object may be expressed as a representative point such as the center of gravity or a corner of the object or may be expressed as a drawn area (for example, a circumscribed rectangle). When an object is a mobile object, the "state" of the object may include an acceleration or a jerk of the object or a "moving state" (for example, whether lane change is being performed or whether lane change is going to be performed).

The recognizer 130 may recognize a color of a light source that is emitted as light from a light emitter of a signal, a road structure (for example, road circumstances near a crossing), or other road events on the basis of an image captured by the camera 10.

The recognizer 130 recognizes, for example, a lane in which the vehicle M travels (a traveling lane) as surrounding circumstances of the vehicle M. For example, the recognizer 130 recognizes the traveling lane by comparing a pattern of road markings near the vehicle M which are recognized from an image captured by the camera 10 with a pattern of road markings (for example, arrangement of a solid line and a dotted line) which are acquired from the second map information 62. The recognizer 130 may recognize the traveling lane as well as road markings by recognizing a traveling road boundary (a road boundary) including road markings, edges of a roadside, a curbstone, a median, and a guard rail. In this recognition, the position of the vehicle M acquired from the navigation device 50 and the result of processing from the INS may be considered.

The recognizer 130 recognizes a position or a direction of the vehicle M with respect to the traveling lane at the time of recognition of the traveling lane. The recognizer 130 may recognize, for example, separation of a reference point of the vehicle M from the lane center and an angle of the traveling direction of the vehicle M with respect to a line formed by connecting the lane centers as the position and the direction of the vehicle M relative to the traveling lane. Instead, the recognizer 130 may recognize a position of the reference point of the vehicle M relative to one side line of the traveling lane (a road marking or a road boundary) or the like as the position of the vehicle M relative to the traveling lane. The function of a traffic guide object selector 132 of the recognizer 130 will be described later.

The behavior plan creator 140 generates a target path in which the vehicle M will travel automatically (without requiring a driver's operation) in the future such that the vehicle M travels on a recommended lane determined by the recommended lane determiner 61 in principle and copes with surrounding circumstances of the vehicle M on the basis of a result of recognition from the recognizer 130. A target path includes, for example, a speed element. For example, a target path is expressed by sequentially arranging points (path points) at which the vehicle M will arrive. The path points are points at which the vehicle M is to arrive at intervals of a predetermined traveling distance (for example, about several [m]) along a road, and a target speed and a target acceleration at intervals of a predetermined sampling time (for example, about several tens of [sec]) are generated as a part of a target path in addition. Path points may be positions at which the vehicle M is to arrive at sampling times every predetermined sampling time. In this case, information of a target speed or target acceleration is expressed by intervals of the path points. The behavior plan creator 140 generates a target path along which the vehicle M is to travel by more appropriate driving control on the basis of a result of recognition from the recognizer 130.

The behavior plan creator 140 may set events of automated driving in generating a target path. The events of automated driving include a constant-speed travel event, a low-speed following travel event, a lane change event, a branching event, a merging event, and a collision avoidance event. The behavior plan creator 140 generates a target path based on events which are started.

The second controller 160 controls the travel driving force output device 200, the brake device 210, and the steering device 220 such that the vehicle M passes along the target path generated by the behavior plan creator 140 as scheduled.

The second controller 160 includes, for example, an acquirer 162, a speed controller 164, and a steering controller 166. The acquirer 162 acquires information of a target path (path points) generated by the behavior plan creator 140 and stores the generated information in a memory (not shown). The speed controller 164 controls the travel driving force output device 200 or the brake device 210 on the basis of a speed element pertained to the target path stored in the memory. The steering controller 166 controls the steering device 220 on the basis of a curved state of the target path stored in the memory. The processes of the speed controller 164 and the steering controller 166 are embodied, for example, in a combination of feed-forward control and feedback control. For example, the steering controller 166 performs feed-forward control based on a curvature of a road in front of the vehicle M and feedback control based on separation from the target path in combination.

Referring back to FIG. 1, the HMI controller 180 notifies an occupant of predetermined information using the HMI 30. The predetermined information is, for example, information associated with traveling of the vehicle M such as information on the state of the vehicle M or information on driving control. The information on the state of the vehicle M includes, for example, the speed of the vehicle M, an engine rotation speed, a shift position, and details which are presented by a traffic guide object which the vehicle M is to follow. The details which are presented by a traffic guide object which the vehicle M is to follow include, for example, a color of a signal which the vehicle M is to follow or details of a traffic sign of a road in the traveling direction (for example, no entry and one-way traffic). The information on driving control includes, for example, operation states of driving support functions such as ACC, LKAS, and CMBS or information on reasons for performing the driving support functions. The predetermined information may include information which is not associated with traveling of the vehicle M such as a television programs and contents (for example, movies) stored in a storage medium such as a DVD. The HMI controller 180 may output information received by the HMI 30 to the communication device 20, the navigation device 50, the first controller 120, and the like.

The storage 190 is embodied, for example, by a nonvolatile storage device such as a read only memory (ROM), an electrically erasable and programmable read only memory (EEPROM), or an HDD and a volatile storage device such as a random access memory (RAM) or a register. For example, traffic guide object shape information 192 and a variety of other information are stored in the storage 190. In the traffic guide object shape information 192, for example, shape information is correlated with a traffic guide object. When a traffic guide object is a signal, the shape information includes lengths such as a width, a length, and a depth and an aspect ratio of a housing of a signal which is actually installed and a diameter and an area of a light emitter which is provided in the signal. When a traffic guide object is a traffic sign, the shape information includes a vertical length and a horizontal length of a sign board, marks or characters drawn on a sign board or a road surface, and an area of a sign board. The shape information may include information of a reference shape (for example, a rough shape such as a circle, a square, or an equilateral triangle) of a traffic guide object. The traffic guide object shape information 192 may include installation position information correlated with a traffic guide object. The traffic guide object shape information 192 may include shape information which is derived by deep learning using images captured by the camera 10 in the past instead of (or in addition to) preset shape information.

The travel driving force output device 200 outputs a travel driving force (a torque) for allowing a vehicle to travel to driving wheels. The travel driving force output device 200 includes, for example, a combination of an internal combustion engine, an electric motor, and a transmission and an electronic controller (ECU) that controls them. The ECU controls the above-mentioned configuration on the basis of information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of information input from the second controller 160 or information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of information input from the second controller 160 or information input from the driving operator 80 to change the direction of the turning wheels.

Function of Traffic Guide Object Selector

Figure 3:
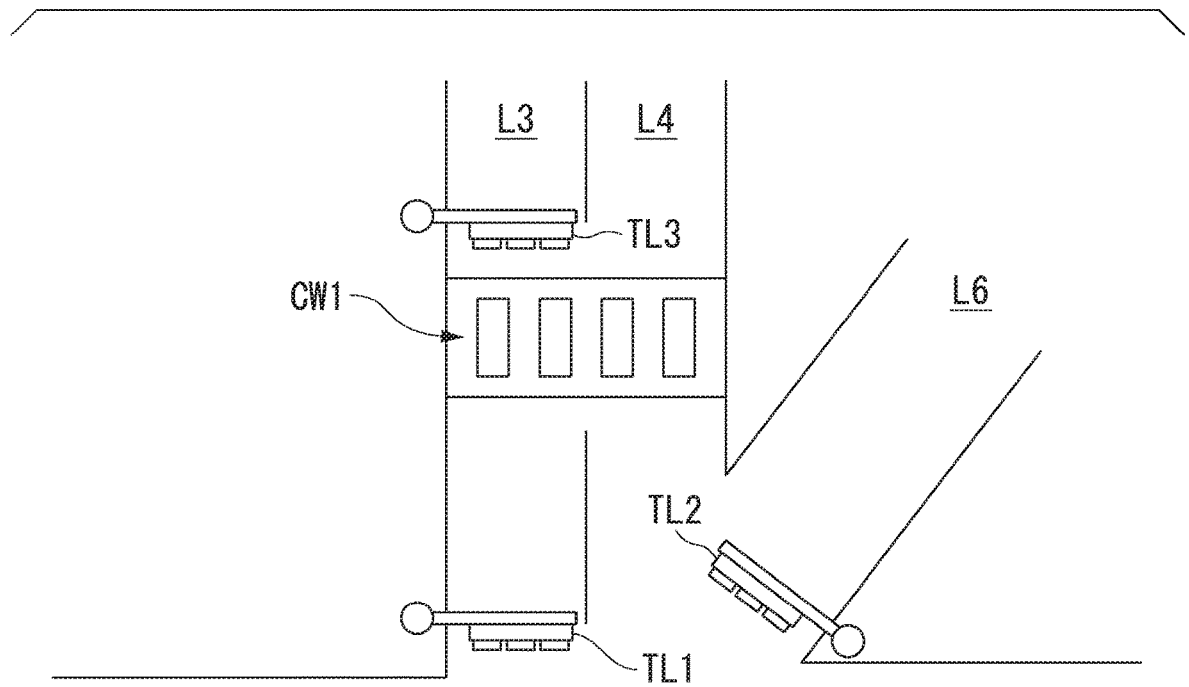
FIG. 3 is a diagram showing a process routine which is performed by a traffic guide object selector.
Figure 3:
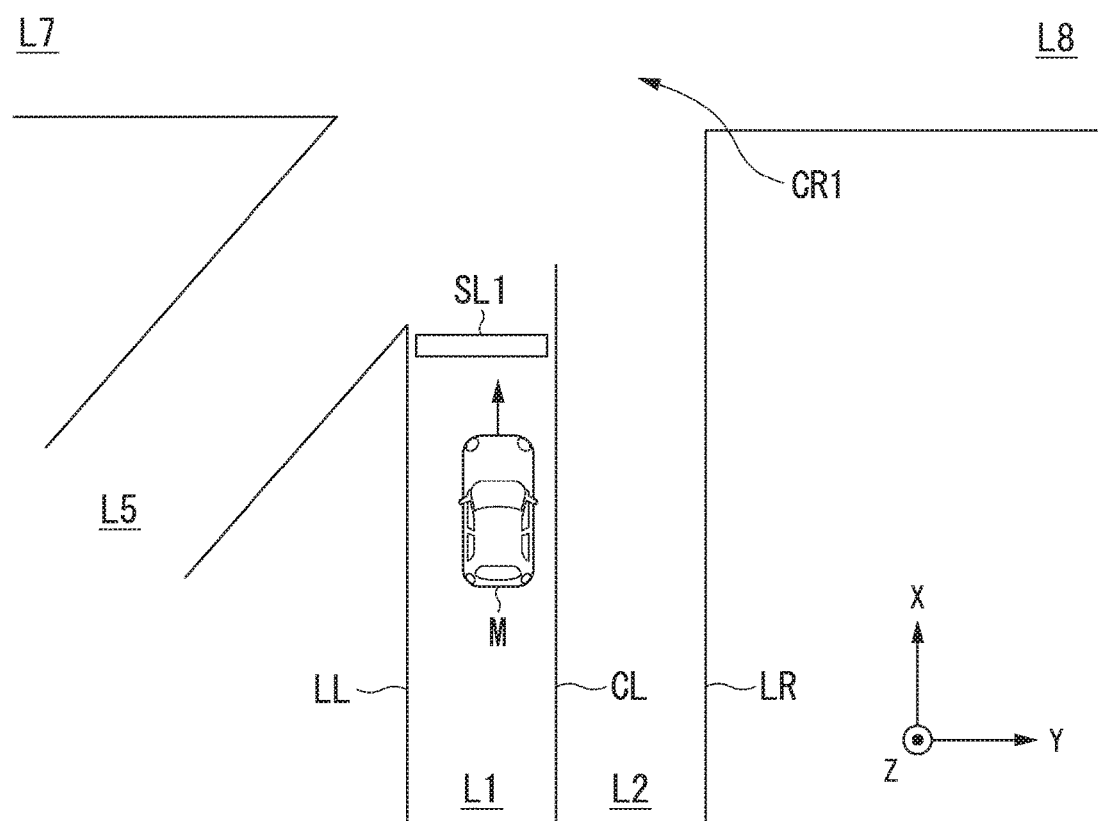

For example, the traffic guide object selector 132 selects a traffic guide object which the vehicle M is to follow out of traffic guide objects which are provided near the vehicle M. The traffic guide object selector 132 causes the behavior plan creator 140 to create a target path on the basis of the selected traffic guide object. FIG. 3 is a diagram showing a process which is performed by the traffic guide object selector 132. In the example shown in FIG. 3, it is assumed that lanes L1 to L8 are connected to a crossing CR1 and the vehicle M travels in the lane L1 toward the crossing CR1. The crossing CR1 is an example of an anomalous crossing. Examples of the anomalous crossing include a crossing at which at least some of lanes connected to the crossing are not orthogonal (including an allowable range) to other lanes and a crossing at which traffic guide objects of a plurality of lanes are recognizably installed when the front is seen from a vehicle traveling toward the crossing. In the example shown in FIG. 3, the lanes L1 to L4 extend in an X-axis direction in the drawing, the lanes L7 and L8 extend in a Y-axis direction in the drawing, and the lanes L5 and L6 are lanes which are not orthogonal to the lanes L1 to L4, L7, and L8.

In the following description, it is assumed that a host vehicle M passes through the crossing CR1 and travels in the lane L3 and only signals TL1 to TL3, a stop line SL1, and a crosswalk CW1 are illustrated as an example of traffic guide objects for the purpose of convenience of explanation. For example, the signals TL1 to TL3 are installed at a predetermined height on a roadside or on a road using a support member such as a pole or a post. The signal TL1 instructs travel permission or stop of a vehicle which enters the crossing CR1 from the lane L1. The signal TL2 instructs travel permission or stop of a vehicle which enters the crossing CR1 from the lane L5. The signal TL3 instructs travel permission or stop of a vehicle which travels in the lane L3 and passes through the crosswalk CW1.

The traffic guide object selector 132 recognizes traffic guide objects which are provided in front of the vehicle M (in the traveling direction) on the basis of information which is input from the camera 10, the radar device 12, and the finder 14 via the object recognition device 16. For example, the traffic guide object selector 132 recognizes traffic guide objects in front of the vehicle M on the basis of an image which is captured by the camera 10 while the vehicle M is traveling in the lane L1 or the like and selects a traffic guide object which the vehicle M is to follow on the basis of the result of recognition. In the following description, a method of selecting a traffic guide object which the vehicle M is to follow will be described in several examples. Signals will be mainly described below as traffic guide objects.

FIRST EXAMPLE

Figure 4:
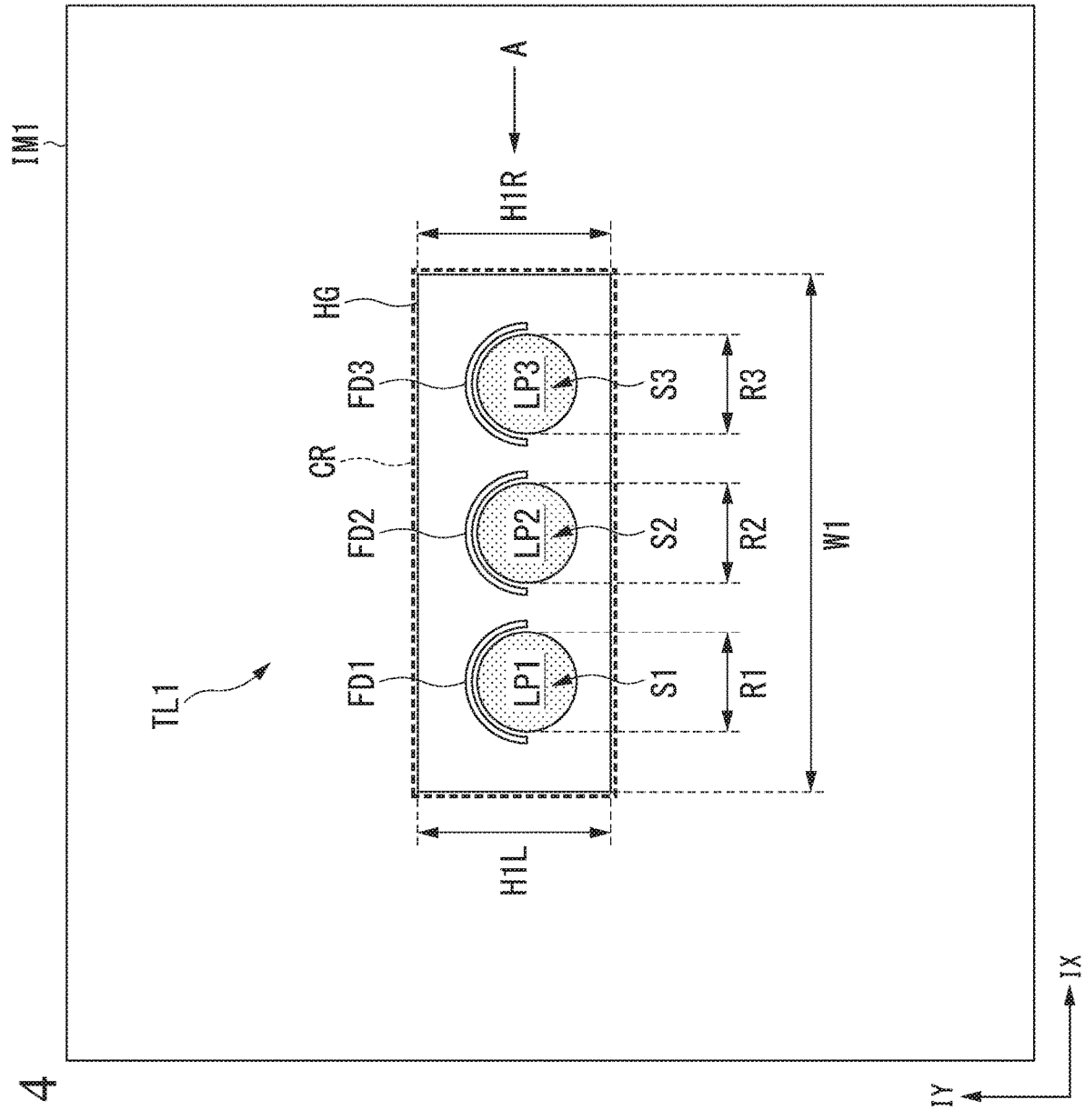
FIG. 4 is a diagram showing an example of an image including a traffic signal which is imaged by a camera of a vehicle which travels in a lane.
Figure 5:
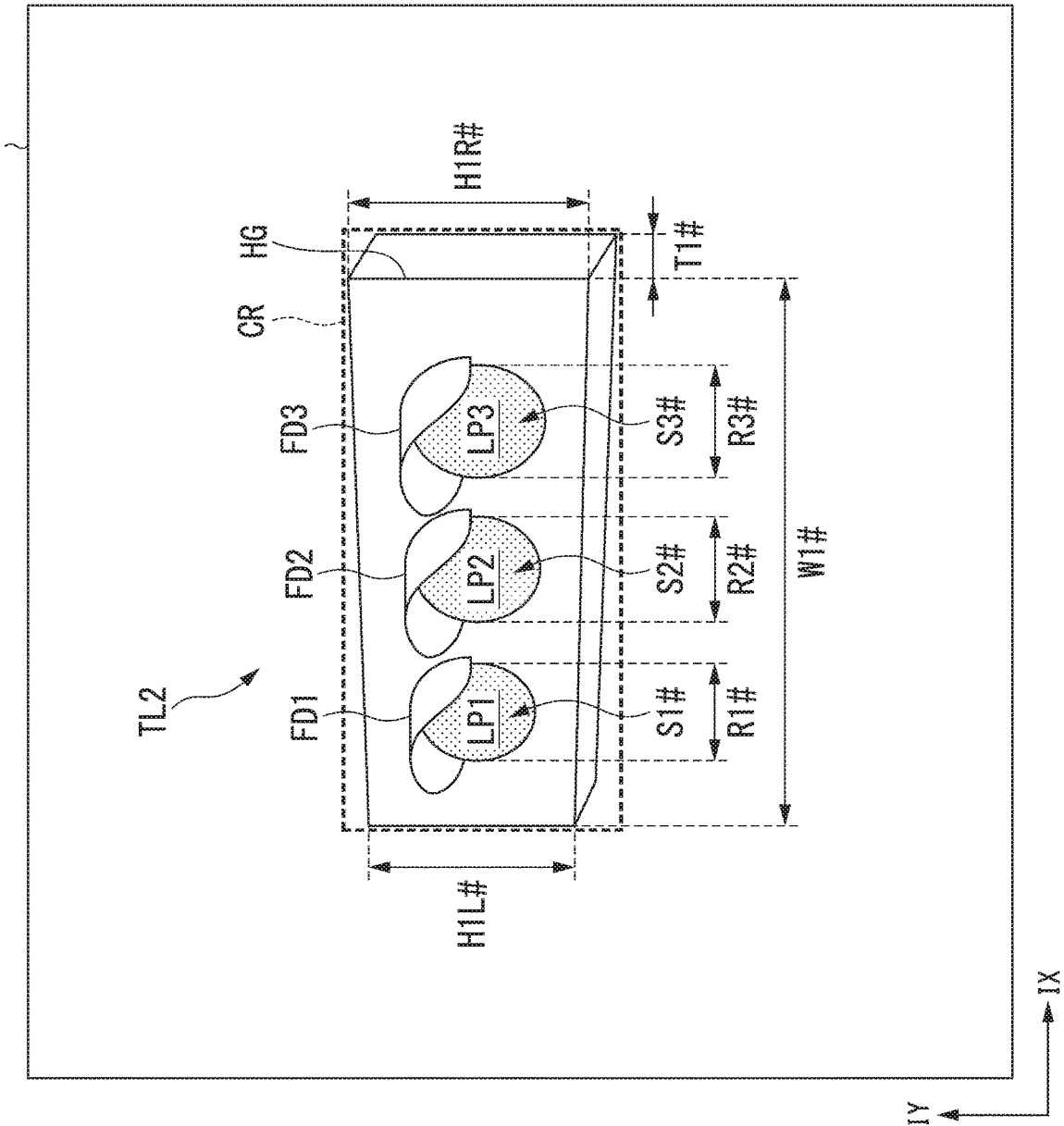
FIG. 5 is a diagram showing an example of an image including a traffic signal which is imaged by a camera of a vehicle which travels in a lane.

FIG. 4 is a diagram showing an example of an image IM1 including a signal TL1 which is imaged by the camera 10 of the vehicle M which is traveling in the lane L1. FIG. 5 is a diagram showing an example of an image IM2 including a signal TL2 which is imaged by the camera 10 of the vehicle M which is traveling in the lane L1. The image IM1 and the image IM2 are acquired by cutting out image areas around the signals TL1 and TL2 in an image in front of the vehicle M which has been captured by the camera 10.

Each of the signals TL1 and TL2 includes, for example, a housing HG, light emitters (color lamps) LP1 to LP3, and hood portions FD1 to FD3. The light emitters LP1 to LP3 emit light of different colors. The different colors include, for example, a color representing pass permission (for example, green), a color representing stop recommendation (for example, yellow), and a color representing pass prohibition (stop instruction) (for example, red). A signal in the embodiment has only to have a configuration including at least a light emitter (a first light emitter) that emits light of a color representing pass permission and a light emitter (a second light emitter) that emits light of a color representing pass prohibition.

Figure 6:
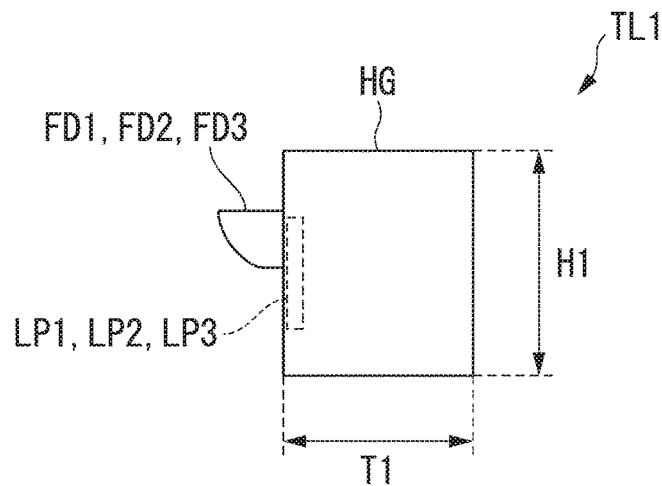
FIG. 6 is a side view of a traffic signal (when seen in a direction of arrow A in FIG. 4)

The hood portions FD1 to FD3 are provided above the light emitters LP1 to LP3, respectively. FIG. 6 is a diagram showing the signal TL1 when seen obliquely to the horizontal direction (in the direction of arrow A in FIG. 4). When the signal TL1 is seen obliquely to the horizontal direction, the hood portions FD1 to FD3 protrude by a predetermined length toward emission destinations of the light emitters LP1 to LP3. The hood portions FD1 to FD3 have a shape that is curved along an outer circumference or a tubular shape to cover at least the tops of the corresponding light emitters LP1 to LP3. With the above-mentioned configuration, the hood portions FD1 to FD3 improve visibility of the light emitters LP1 to LP3 when seen from the front, for example, by preventing sunlight from being applied to the light emitters LP1 to LP3 or preventing snow from being attached to the light emitters LP1 to LP3 during snowfall. The signals may have a configuration in which the hood portions are not provided.

The traffic guide object selector 132 derives a shape of a the housing HG or a circumscribed rectangle CR thereof in image areas which are recognized to be occupied by the signals TL1 and TL2 through a feature extracting process such as edge processing or a pattern matching process on the basis of pixel information (such as color information and luminance information) included in the images IM1 and IM2. The traffic guide object selector 132 acquires a vertical length (in an IX-axis direction) and a horizontal length (in an IY-axis direction) in an image-plane coordinate system (IX, IY) from the derived shape or circumscribed rectangle CR of the housing HG. The traffic guide object selector 132 may acquire a deep length (thickness) T1 of the housing HG on the basis of the directions of the signals TL1 and TL2 included in the images. In the example shown in FIG. 5, the traffic guide object selector 132 may recognize a deep length T1 # of the signal TL2.

In the examples shown in FIGS. 4 and 5, the traffic guide object selector 132 derives right and left vertical lengths H1L and H1R and a horizontal length W1 of the shape of the housing HG of the signal TL1 and right and left vertical lengths H1L # and H1R # and a horizontal length W1 # of the shape of the housing HG of the signal TL2 from the images IM1 and IM2. The traffic guide object selector 132 determines whether the signals TL1 and TL2 are a signal which the vehicle M is to follow on the basis of ratios of the vertical and horizontal lengths acquired from the images (for example, image aspect ratios H1L/W1 and H1L #/W1 #) and a reference aspect ratio of the signals TL1 and TL2 stored in advance in the traffic guide object shape information 192 when seen from the front (for example, a vertical length H0/a horizontal length W0).

For example, when a similarity between the image aspect ratio and the reference aspect ratio is equal to or greater than a threshold value, the traffic guide object selector 132 determines that the corresponding signal is a signal which faces the front of the vehicle M (which faces the vehicle) and selects the signal TL1 as the signal which the vehicle M is to follow. When the similarity between the image aspect ratio and the reference aspect ratio is less than the threshold value, the traffic guide object selector 132 does not select the signal TL1 as the signal which the vehicle M is to follow. Here, since the signal TL1 substantially faces the front of the vehicle M, the similarity thereof to the reference aspect ratio is high. Since the signal TL2 obliquely faces the vehicle M, the similarity thereof to the reference aspect ratio is low. Accordingly, the traffic guide object selector 132 selects the signal TL1 as the signal which the vehicle M is to follow and does not select the signal TL2 as the signal which the vehicle M is to follow.

In the first example, the traffic guide object selector 132 may compare the area in the image area of the housing HG with the area in the image area of the circumscribed rectangle CR, determine that the signal is a signal which faces the front of the vehicle M when both areas are equal or similar to each other (a difference therebetween is less than a predetermined value), and determine that the signal is a signal which does not face the front of the vehicle M when both areas are not equal or similar to each other. In this way, according to the first example, even when colors of the light emitters of a plurality of signals are recognized due to an anomalous crossing or the like, it is possible to accurately recognize a traffic guide object which the vehicle M is to follow. According to the first example, it is possible to accurately recognize front directions (direction vectors) of the signals TL1 and TL2 by using the shapes or the circumscribed rectangles CR of the housings HG in the image areas which are recognized to be occupied by the signals TL1 and TL2.

SECOND EXAMPLE

In a second example, instead of (or in addition to) the similarity between the aspect ratios, the traffic guide object selector 132 compares right and left vertical lengths of the housing HG or the circumscribed rectangle CR and selects a signal which the vehicle M is to follow on the basis of the result of comparison. In this case, the traffic guide object selector 132 derives, for example, right and left vertical lengths H1L and H1R of the housing HG in the image area which is recognized to be occupied by the signal TL1, determines that the signal TL1 faces the front of the vehicle M when the derived lengths H1L and H1R are equal or similar to each other (for example, when a length difference therebetween is equal to or less than a predetermined length), and determines that the signal TL2 does not face the front of the vehicle M when the lengths are not equal or similar to each other. This determination is also performed for other signals which are included in the image area. The traffic guide object selector 132 selects a signal which faces the front of the vehicle M as the signal which the vehicle M is to follow. In this way, according to the second example, it is possible to determine whether a signal faces the front of a vehicle simply without performing comparison with the reference aspect ratio stored in advance as in the first example.

THIRD EXAMPLE

In a third example, when the light emitters LP1 to LP3 of the signals TL1 and TL2 are arranged horizontally, the traffic guide object selector 132 acquires diameters R1 to R3 and R1 # to R3 # or areas S1 to S3 and S1 # to S3 # in the image area which is recognized to be occupied by the light emitters LP1 to LP3 and selects a signal which the vehicle M is to follow by comparing the diameters or areas of the signals, instead of (or in addition to) comparing the shape or the circumscribed rectangle CR of the housing HG.

For example, when the light emitters LP1 to LP3 are seen from the front, the image areas which are recognized to be occupied by the light emitters have the same or similar diameters or areas. When the light emitters LP1 to LP3 are seen obliquely, the diameter or area on a distant side is less than that on a near side. Accordingly, by comparing the diameters or areas of the light emitters, it is possible to more accurately determine whether a signal faces the front of the vehicle M. In the example shown in FIG. 4, a diameter ratio of the diameters R1 to R3 or an area ratio of the areas S1 to S3 of the light emitters LP1 to LP3 of the signal TL1 is equal or similar to 1. In this case, the traffic guide object selector 132 determines that the signal TL1 faces the front of the vehicle M and selects the signal TL1 as a signal which the vehicle M is to follow. In the example shown in FIG. 5, since the diameters R1 # to R3 # or the areas S1 # to S3 # of the light emitters LP1 to LP3 of the signal TL2 decrease in the order of R3 #, R2 #, and R1 # or the order of S3 #, S2 #, and S1 #, the diameter ratio or the area ratio is not close to 1. In this case, the traffic guide object selector 132 determines that the signal TL2 does not face the front of the vehicle M and does not select the signal TL2 as the signal which the vehicle M is to follow. In this way, according to the third example, it is possible to more appropriately select a signal which the vehicle M is to follow using the image areas which are recognized to be occupied by the light emitters LP1 to LP3.

When a signal does not face the front of the vehicle M like the signal TL2 in FIG. 5, parts of the light emitters LP1 to LP3 are hidden by the hood portions FD1 to FD3. Accordingly, the traffic guide object selector 132 may derive degrees of shielding of the light emitters LP1 to LP3 by the hood portions FD1 to FD3 and determine whether the signal faces the front of the vehicle M on the basis of the derived degrees of shielding. The degree of shielding includes, for example, an area (an amount of shielding) of the shielded image area of the light emitter or a shielding direction (in what direction it is shielded).

Figure 7:
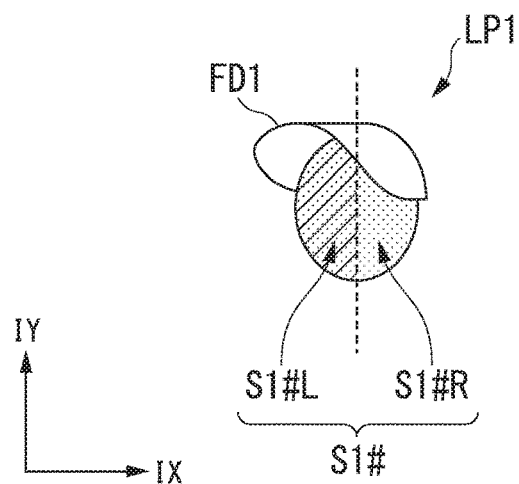
FIG. 7 is a diagram showing deriving of a degree of shielding of a light emitter by a hood portion.

FIG. 7 is a diagram showing derivation of a degree of shielding of a light emitter by a hood portion. In FIG. 7, a partial image including the light emitter LP1 and the hood portion FD1 included in the image IM2 is illustrated. For example, the traffic guide object selector 132 acquires right and left areas S1 #L and S1 #R which are obtained by dividing the area S1 # of the image area which is recognized to be occupied by the light emitter LP1 by a line extending vertically (in the IY-axis direction in the drawing) through the center of the image area. Then, the traffic guide object selector 132 derives degrees of shielding, for example, on the basis of the difference between the acquired areas S1 #L and S1 #R. For example, when the area S1 #R is less than the area S1 #L and a difference therebetween is equal to or greater than a threshold value as shown in FIG. 7, the traffic guide object selector 132 determines that the signal TL2 faces the left side with respect to the front of the vehicle M and does not face the front of the vehicle M. For example, the traffic guide object selector 132 may detect a degree of shielding by pattern matching based on the standard shape of the hood portion FD1 or the light emitter LP1. Through the above-mentioned processes, it is possible to recognize that the signal TL2 does not face the front of the vehicle M and to accurately recognize what side the signal TL2 faces with respect to the front of the vehicle M.

When the signals do not include hood portions, the traffic guide object selector 132 may determine whether a shape of an image area which is recognized to be occupied by each of the light emitters LP1 to LP3 is a reference shape (for example, a circle, a square, or an equilateral triangle) which is stored in the traffic guide object shape information 192, and determine that the signals do not face the front when it is determined that the shape of the image area is not the reference shape.

Figure 8:
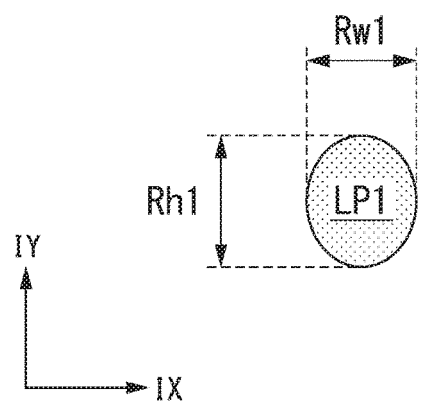
FIG. 8 is a diagram showing an example of an image area which is recognized to be occupied by a light emitter of a traffic signal not including a hood portion.

FIG. 8 is a diagram showing an example of an image area which is recognized to be occupied by a light emitter of a signal not including a hood portion. In the example shown in FIG. 8, an image area of the light emitter LP1 which is recognized to be occupied by the light emitter is illustrated. In the following description, it is assumed that an actual shape of the light emitter is circular. For example, the traffic guide object selector 132 derives a vertical length Rh1 (in the IX-axis direction in the drawing) and a horizontal length Rw1 (in the IY-axis direction in the drawing) of the light emitter LP1 in the image area, and determines that the light emitter LP1 is circular and that the signal faces the front when the derived lengths Rh1 and Rw1 are equal or similar to each other (for example, when a difference between Rh1 and Rw1 is less than a predetermined value). When the lengths Rh1 and Rw1 are not equal or similar to each other, the traffic guide object selector 132 determines that the light emitter LP1 is not circular and that the signal does not face the front.

FOURTH EXAMPLE

For example, when a vehicle approaches the right side or the left side in the lane L1 in order to turn right or left at the crossing CR1, the direction of the vehicle body may be oblique to the lane and thus there is a likelihood that a signal which the vehicle M is to follow will be erroneously recognized. Therefore, in a fourth example, instead of (or in addition to) setting the direction of the vehicle M as a reference, the traffic guide object selector 132 selects a signal which the vehicle M is to follow by deriving an angle formed by the front direction of the signal and a line perpendicular to a marking for defining the lane in which the vehicle M travels and determining the direction of the signal on the basis of the derived angle.

Figure 9:
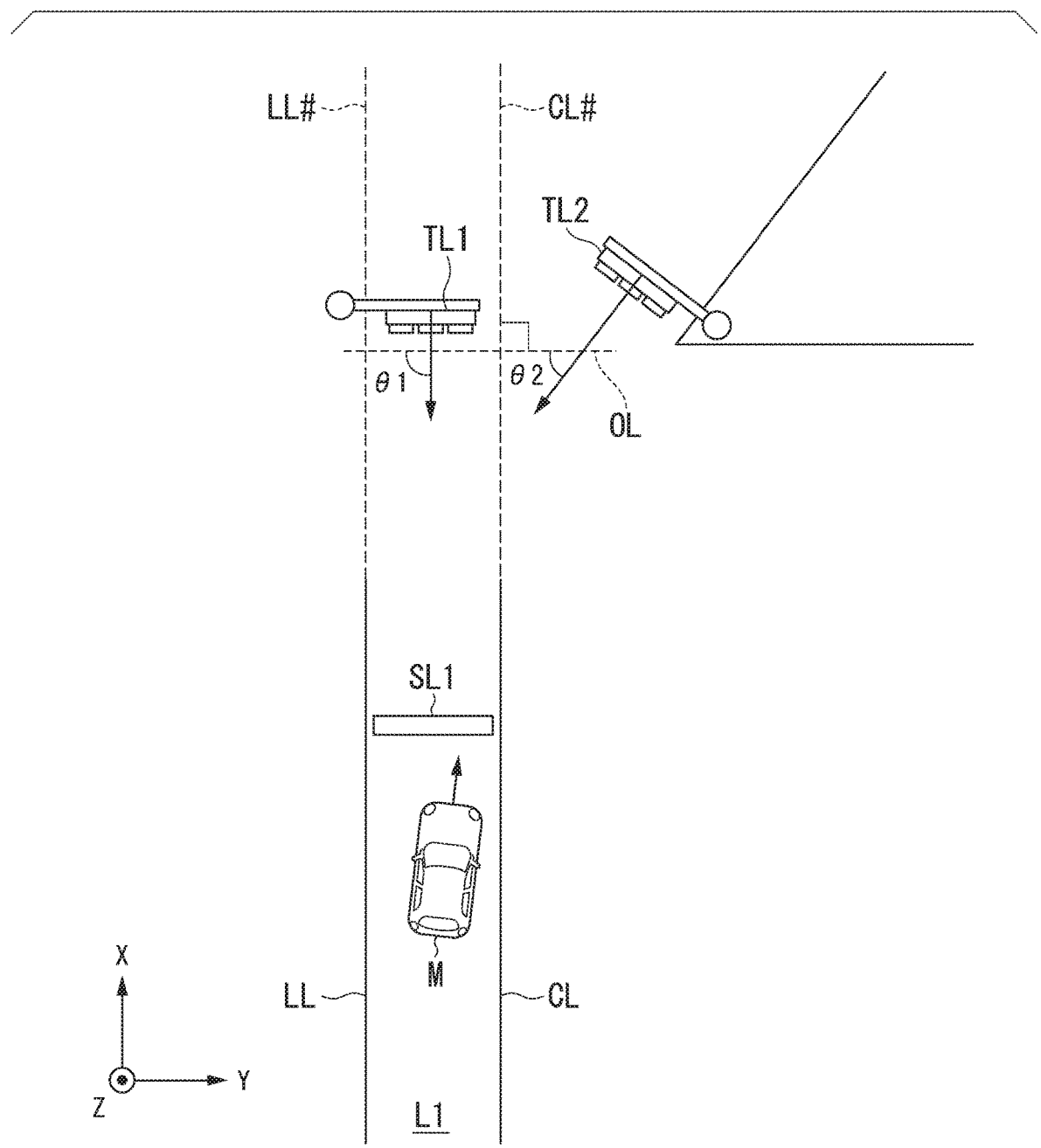
FIG. 9 is a diagram showing deriving of a direction of a traffic signal with respect to a lane.

FIG. 9 is a diagram showing derivation of a direction of a signal with respect to a lane. In the example shown in FIG. 9, the directions of the signals TL1 and TL2 are derived when the vehicle M travels in the lane L1. The traffic guide object selector 132 sets virtual lines LL # and CL # which extend in an extending direction from right and left markings LL and CL defining the lane L1 in which the vehicle M travels, and derives an angle θ which is formed by a line OL perpendicular to the set virtual lines LL # and CL # and the front direction of the signal.

In the example shown in FIG. 9, the traffic guide object selector 132 derives angles θ1 and θ2 which are formed by the signals TL1 and TL2 and the line OL. Then, when each of the derived angles θ1 and θ2 is equal to or close to 90 degrees (for example, about 80 degrees to 100 degrees), the traffic guide object selector 132 determines that the corresponding signal is perpendicular to the lane L1, and selects the corresponding signal as a signal which the vehicle M is to follow. When the angle is not close to 90 degrees, the traffic guide object selector 132 determines that the corresponding signal is not perpendicular to the lane L1, and does not select the corresponding signal as a signal which the vehicle M is to follow. In the example shown in FIG. 9, the signal TL1 is selected as a signal which the vehicle M is to follow. In this way, according to the fourth example, it is possible to recognize an accurate direction of a signal regardless of behavior of the vehicle M and to more accurately select a signal which the vehicle M is to follow.

FIFTH EXAMPLE

In a fifth example, the traffic guide object selector 132 derives directions of signals with respect to directions of traffic signs which are drawn on the road surface or the like instead of (or in addition to) the markings, and selects a signal which the vehicle M is to follow on the basis of the result of derivation. For example, in FIG. 9, a stop line SL1 is drawn to be long in a direction perpendicular to the markings LL and CL of a lane L1. Accordingly, according to the fifth example, the traffic guide object selector 132 can acquire the directions of the signals with respect to the lane L1, similarly to the fourth example, by deriving angles which are formed by the direction in which the stop line SL1 extends longitudinally and the front directions of the signals, and can more accurately select a signal which the vehicle M is to follow on the basis of the acquired directions.

SIXTH EXAMPLE

Figure 10:
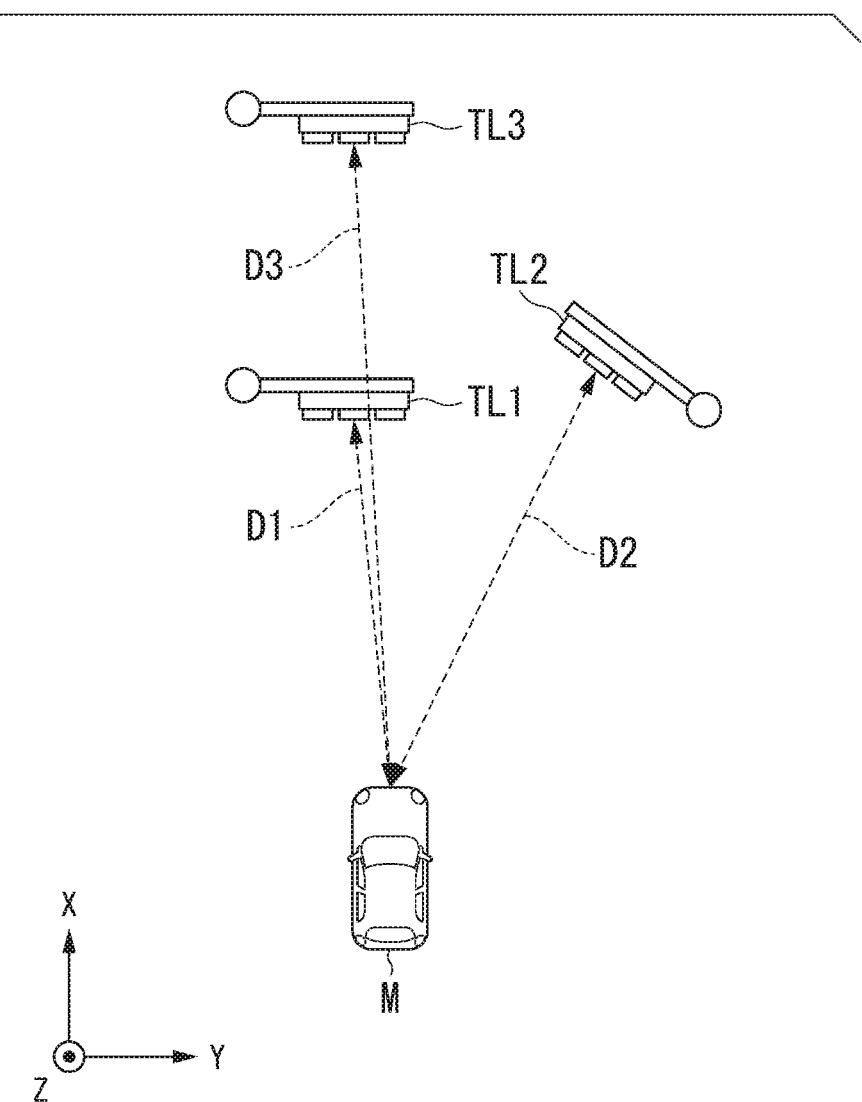
FIG. 10 is a diagram showing a distance between a vehicle and a traffic guide object.

In a sixth example, the traffic guide object selector 132 selects a signal which a vehicle M is to follow on the basis of distances between the vehicle M recognized by the recognizer 130 and traffic guide objects. FIG. 10 is a diagram showing distances between a vehicle M and traffic guide objects. In the example shown in FIG. 10, a vehicle M and signals TL1 to TL3 in the same state as illustrated in FIG. 3 are illustrated.

The recognizer 130 recognizes distances D1 to D3 between the signals TL1 to TL3 which are located in front of the vehicle M and the vehicle M, for example, using the camera 10, the radar device 12, or the finder 14. The traffic guide object selector 132 selects the signal TL1 which is located at the shortest distance D1 out of the distances D1 to D3 recognized by the recognizer 130 as a signal which the vehicle M is to follow. In this way, according to the sixth example, for example, when there are a plurality of signals (the signals TL1 and TL3 in FIG. 10) in the front direction of the vehicle M, the signal TL3 is also a signal which the vehicle M is to follow but more appropriate driving control can be performed by giving priority to the signal TL1 before the signal TL3.

SEVENTH EXAMPLE

A seventh example is an example in which there are a plurality of lanes in which a vehicle M can travel in the same direction and signals are installed in parallel. In this case, the traffic guide object selector 132 selects a traffic guide object which the vehicle M is to follow on the basis of distances between the vehicle M and the signals or angles of the signals with respect to the front direction of the vehicle M.

Figure 11:
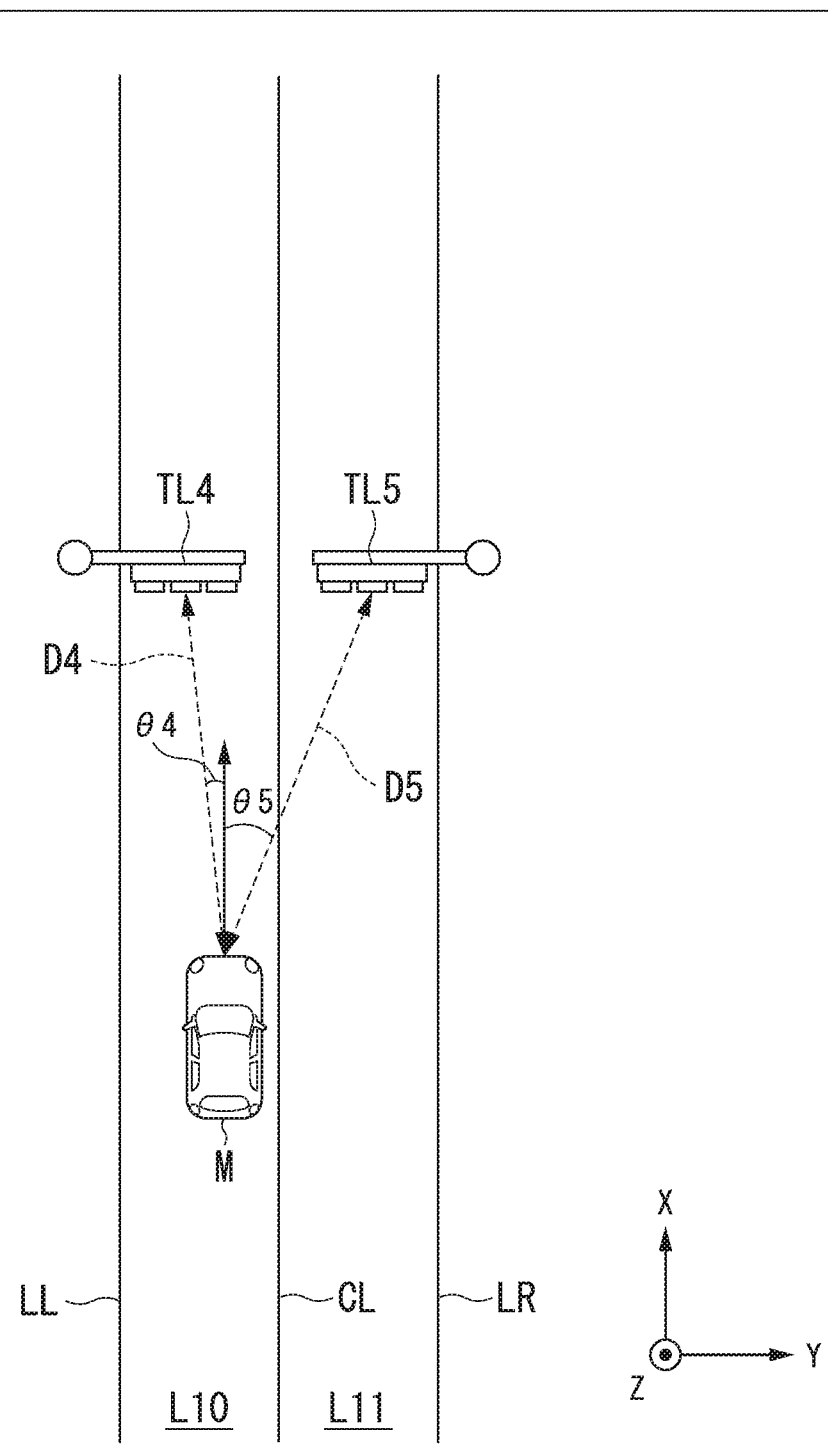
FIG. 11 is a diagram showing a process routine which is performed by a traffic guide object selector in an example in which traffic guide objects are provided in parallel.

FIG. 11 is a diagram showing a process which is performed by the traffic guide object selector 132 when traffic guide objects are installed in parallel. In the example shown in FIG. 11, it is assumed that two lane sL10 and L11 which extend in the same direction (an X-axis direction in the drawing) and in which a vehicle M can travel in the same direction and signals TL4 and TL5 which instruct pass permission or stop of a vehicle are installed in correlation with the lanes L10 and L11. It is assumed that the signals TL4 and TL5 are determined to face the front of the vehicle M by the traffic guide object selector 132.

In this case, the traffic guide object selector 132 derives distances D4 and D5 from the vehicle M to the signals TL4 and TL5, and selects the signal with the smaller distance out of the derived distances D4 and D5 as a signal which the vehicle M is to follow. The traffic guide object selector 132 derives angles θ4 and θ5 which are formed by the front direction of the vehicle M and the front directions of the signals TL4 and TL5, and selects the signal with the smaller angle as a signal which the vehicle M is to follow. In the example shown in FIG. 11, the distance D4 is smaller than the distance D5 and the angle θ4 is smaller than the angle θ5. Accordingly, the traffic guide object selector 132 selects the signal TL4 as a signal which the vehicle M is to follow. The traffic guide object selector 132 may select a signal using one of the distances and the angles or select a signal using both thereof.

EIGHTH EXAMPLE

In an eighth example, the traffic guide object selector 132 acquires directions of traffic guide objects which are located in the traveling direction of a vehicle M from map information near current position information of the vehicle M with reference to the second map information 62 on the basis of the current position information of the vehicle M, and selects a traffic guide object which the vehicle M is to follow on the basis of the acquired information. In this case, the traffic guide object selector 132 performs matching based on feature information or the like between a traffic guide object included in an image captured by the camera 10 and a traffic guide object acquired from the second map information 62, for example, on the basis of the position information or the direction information of the vehicle M. Then, the traffic guide object selector 132 acquires a direction based on absolute coordinates of the matched traffic guide object acquired from the second map information 62. In this way, according to the eighth example, it is possible to more accurately acquire directions of traffic guide objects with respect to the vehicle M by acquiring installation positions or front directions of the traffic guide objects with respect to the absolute coordinates on a map, and to more appropriately select a traffic guide object which the vehicle M is to follow from the acquired directions.

MODIFIED EXAMPLES

Figure 12:
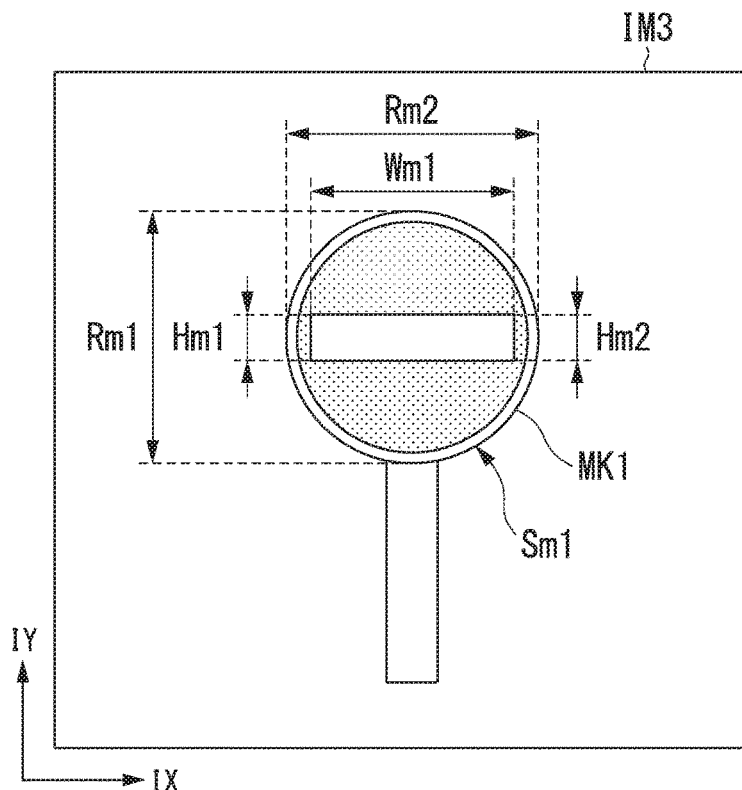
FIG. 12 is a (first) diagram showing an example of an image including a traffic sign which is imaged by a camera of a vehicle.
Figure 13:
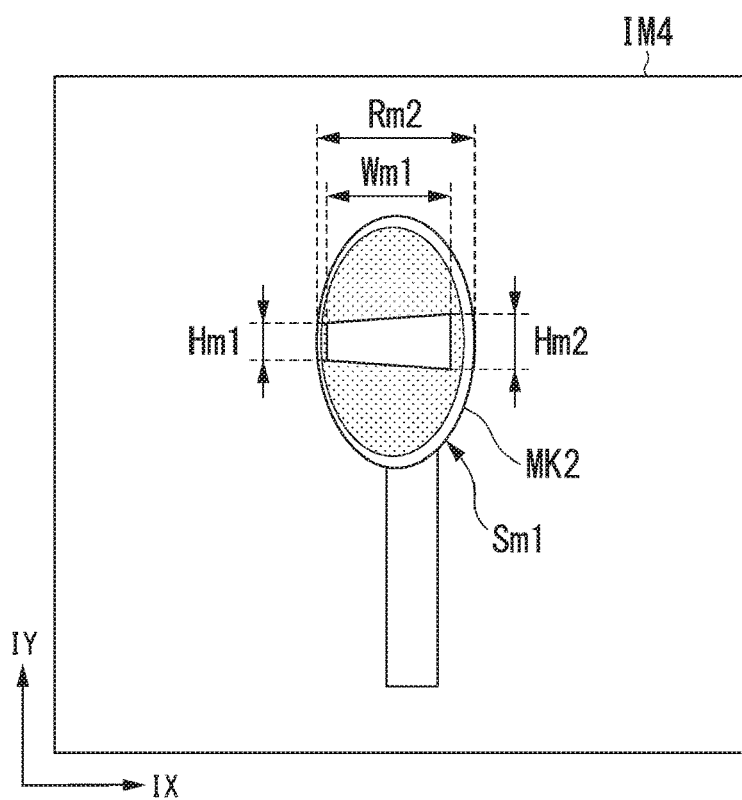
FIG. 13 is a (second) diagram showing an example of an image including a traffic sign which is imaged by a camera of a vehicle.

In the above-mentioned examples, signals are exemplified as the traffic guide objects, but a traffic sign which a vehicle M is to follow is selected out of traffic signs. FIGS. 12 and 13 are (first and second) diagrams showing examples of images including a traffic sign, which is captured by the camera 10 of a vehicle M. An image IM3 shown in FIG. 12 is acquired by trimming an image area around a traffic sign MK1 from a front image of the vehicle M, which is captured by the camera 10. An image IM4 shown in FIG. 13 is acquired by trimming an image area around a traffic sign MK2 from a front image of the vehicle M, which is captured by the camera 10. For example, the traffic signs MK1 and MK2 represent sign information for prohibiting entrance of a vehicle into a front road.

The traffic guide object selector 132 recognizes sizes of the traffic sign MK1 included in the image IM3 and the traffic sign MK2 included in the image IM4 (for example, a diameter Rm1 or an area Sm1 of the whole sign board) or information (for example, right and left vertical lengths Hm1 and Hm2 or a horizontal length Wm1 of a mark drawn on the sign board) acquired from a feature area of the traffic sign MK1 (for example, characters or numerals drawn on the sign board). The traffic guide object selector 132 determines whether the traffic sign MK1 faces the front of the vehicle M on the basis of the recognized sizes of the traffic signs MK1 and MK2 or the information acquired from a feature area and information acquired from the traffic guide object shape information 192. In the examples shown in FIGS. 12 and 13, the traffic guide object selector 132 determines that the traffic sign MK1 out of the traffic signs MK1 and MK2 faces the front of the vehicle M and selects the traffic sign MK1 as a traffic sign which the vehicle M is to follow.

The traffic guide object selector 132 may determine whether traffic guide objects face the front according to the above-mentioned examples and also derive at what angles the traffic guide objects are oblique with respect to the front direction of the vehicle M. In this case, the traffic guide object selector 132 derives at what angles the traffic guide objects are oblique, for example, on the basis of the difference between an image aspect ratio and a reference aspect ratio in the first example or the difference between right and left vertical lengths (for example, H1L and H1R) of the housing HG or the circumscribed rectangle CR in the second example. The traffic guide object selector 132 may derive at what angles the traffic guide objects are oblique on the basis of the difference between the diameters R1 to R3 or the areas S1 to S3 in image areas which are recognized to be occupied by the light emitters LP1 to LP3 in the third example.

Each of the first to eighth examples may be combined with some or all of the other examples. The traffic guide object selector 132 performs the selection method which is described in at least one of the examples on the basis of the surrounding circumstances of the vehicle M, behavior of the vehicle M, settings by an occupant, or the like. In the above-mentioned examples, recognition or selection of a traffic guide object may be performed in combination of the results of detection from the radar device 12 or the finder 14 in addition to the camera 10. It is possible to more accurately select a traffic guide object which the vehicle M is to follow by using the selection methods described in a plurality of examples. It is possible to perform more appropriate driving control of the vehicle M (which includes driving support for an occupant) using the selected traffic guide object.

For example, when a vehicle M turns right or left at the time of entering the crossing CR1 from the lane L1 shown in FIG. 3, a traffic guide object for another lane may face the front of the vehicle M due to turning behavior of the vehicle M. Accordingly, when the vehicle M enters the crossing CR1 or when a steering angle of the vehicle M is equal to or greater than a threshold angle (when the vehicle M performs behavior of turning right or turning left), the traffic guide object selector 132 may not perform selection of a traffic guide object. Accordingly, it is possible to more appropriately select a traffic guide object which the vehicle M is to follow in the vicinity of a crossing.

Process Flow

Figure 14:
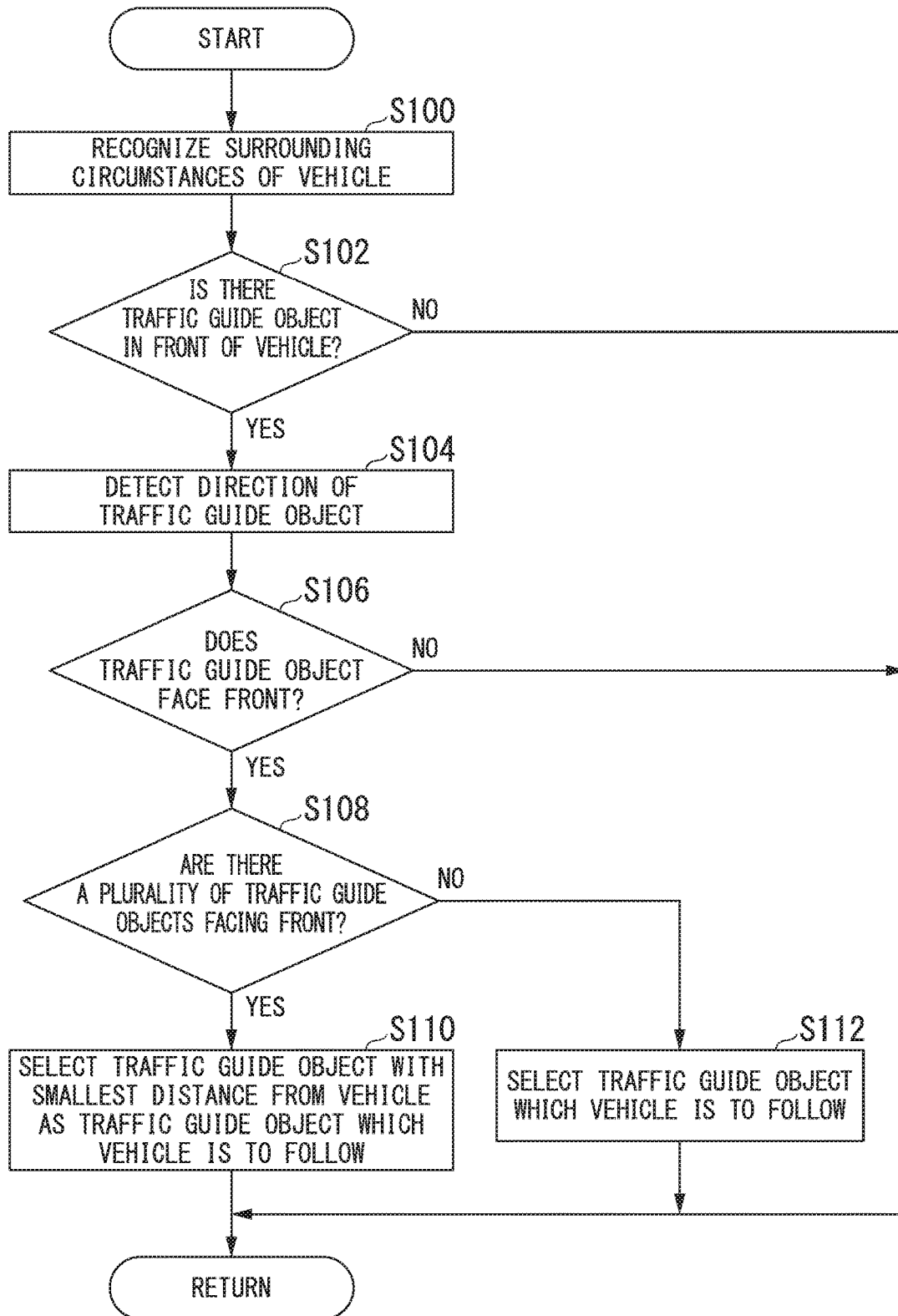
FIG. 14 is a flowchart showing a flow of a process routine which is performed by a traffic guide object recognition device according to the embodiment.

FIG. 14 is a flowchart showing a process flow which is performed by the traffic guide object recognition device according to the embodiment. The processes in the flowchart will be mainly described with a focus on a traffic guide object recognizing process. The process flow in the flowchart may be repeatedly performed, for example, at intervals of a predetermined cycle or at predetermined times.

First, the recognizer 130 recognizes surrounding circumstances of a vehicle M (Step S100). Then, the recognizer 130 determines whether there is a traffic guide object in front of the vehicle M (Step S102). When it is determined that there is a traffic guide object in front of the vehicle M, the traffic guide object selector 132 detects a direction of a recognized traffic guide object (Step S104), and determines whether the traffic guide object faces the front of the vehicle M (Step S106). When it is determined that the traffic guide object faces the front, the traffic guide object selector 132 determines whether there are a plurality of traffic guide objects facing the front (Step S108).

When it is determined that there are a plurality of traffic guide objects facing the front, the traffic guide object selector 132 selects a traffic guide object with the smallest distance from the vehicle M as a traffic guide object which the vehicle M is to follow (Step S110). When it is determined that there are not a plurality of traffic guide objects facing the front, the traffic guide object selector 132 selects the single traffic guide object which is determined to be facing the front as a traffic guide object which the vehicle M is to follow (Step S112). Accordingly, the process flow in the flowchart ends. When it is determined in Step S102 that there is no traffic guide object in front of the vehicle M or when it is determined in Step S106 that the traffic guide object does not face the front of the vehicle M in the traveling direction, the process flow ends.

According to the above-mentioned embodiment, it is possible to improve recognition accuracy for a traffic guide object. Accordingly, it is possible to more appropriately select a traffic guide object which the vehicle M is to follow. According to the above-mentioned embodiment, it is possible to realize more appropriate driving control using the selected traffic guide object.

Hardware Configuration

Figure 15:
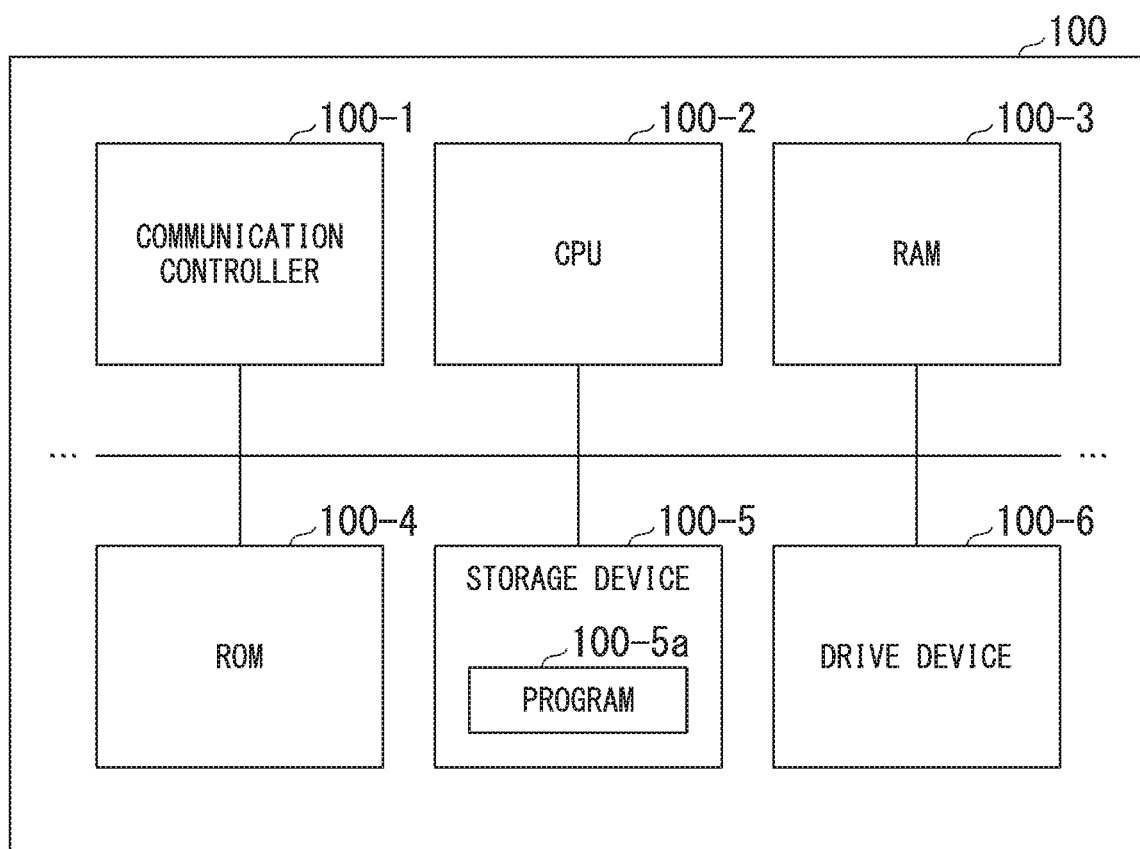
FIG. 15 is a diagram showing an example of a hardware configuration of a driving control device including a part of the traffic guide object recognition device according to the embodiment.

FIG. 15 is a diagram showing an example of a hardware configuration of the driving control device 100 including a part of the traffic guide object recognition device according to the embodiment. As shown in the drawing, a computer of the driving control device 100 has a configuration in which a communication controller 100-1, a CPU 100-2, a RAM 100-3 which is used as a working memory, a ROM 100-4 that stores a booting program or the like, a storage device 100-5 such as a flash memory or an HDD, a drive device 100-6, and the like are connected to each other via an internal bus or a dedicated communication line. The communication controller 100-1 communicates with elements other than the driving control device 100. A program 100-5a which is executed by the CPU 100-2 is stored in the storage device 100-5. This program is loaded into the RAM 100-3 by a direct memory access (DMA) controller (not shown) or the like and is executed by the CPU 100-2. Accordingly, some or all of the elements of the driving control device 100 are embodied.

The above-mentioned embodiment can be expressed as follows:

A traffic guide object recognition device including:
a storage device that stores a program;
an imager that images surroundings of a vehicle; and
a hardware processor,
wherein the hardware processor, by executing the program stored in the storage device, recognizes surrounding circumstances of the vehicle and selects a traffic guide object which the vehicle is to follow on the basis of forms of traffic guide objects in an image captured by the imager out of traffic guide objects which are provided near the vehicle.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A traffic guide object recognition device comprising:
an imager configured to image surroundings of a vehicle; and
a recognizer configured to recognize surrounding circumstances of the vehicle,
wherein the recognizer selects a traffic guide object which the vehicle is to follow on the basis of forms of traffic guide objects in an image captured by the imager out of traffic guide objects which are provided near the vehicle,
wherein the traffic guide objects include a traffic signal including at least a first light emitter that emits light of a color for permitting traveling of the vehicle and a second light emitter that emits light of a color for prohibiting traveling of the vehicle,
wherein the recognizer derives a direction of the traffic signal on the basis of an area of an image area which is recognized to be occupied by the first light emitter and an image area which is recognized to be occupied by the second light emitter when the first light emitter and the second light emitter of the traffic signal are horizontally arranged, and selects the traffic signal which the vehicle is to follow on the basis of the derived direction, and
wherein, when a plurality of light emitters including the first light emitter and the second light emitter of the traffic signal are arranged horizontally and the area of the image area recognized to be occupied by each light emitter is decreasing in the order of the arranged light emitters from position of a light emitter with a largest area, the recognizer determines that the traffic signal does not face the front of the vehicle and does not select the traffic signal as a signal which the vehicle is to follow.

2. The traffic guide object recognition device according to claim 1, wherein the recognizer recognizes the traffic guide objects which are provided near the vehicle on the basis of the image captured by the imager, derives directions of the traffic guide objects on the basis of aspect ratios of image areas which are recognized to be occupied by shapes or feature areas of the recognized traffic guide objects, and selects the traffic guide object which the vehicle is to follow on the basis of the derived directions.

3. The traffic guide object recognition device according to claim 1, wherein the recognizer derives the directions of the traffic guide objects on the basis of a direction in which markings for defining a lane in which the vehicle travels extend.

4. The traffic guide object recognition device according to claim 1, wherein the recognizer acquires map information of the vicinity of the vehicle, recognizes directions of the traffic guide objects which are provided in front of the vehicle from the acquired map information, and selects the traffic guide object which the vehicle is to follow on the basis of the recognized directions.

5. The traffic guide object recognition device according to claim 1, wherein the recognizer selects a traffic guide object from which a distance to the vehicle is short as the traffic guide object which the vehicle is to follow when a plurality of traffic guide objects are recognized.

6. The traffic guide object recognition device according to claim 1, wherein the recognizer derives a direction of the traffic signal on the basis of an aspect ratio of an image area which is recognized to be occupied by the first light emitter or an image area which is recognized to be occupied by the second light emitter, and selects a traffic signal which the vehicle is to follow on the basis of the derived direction.

7. The traffic guide object recognition device according to claim 1, wherein the traffic signal further includes a hood portion which is provided above the first light emitter and the second light emitter and protrudes to emission destinations of the first light emitter and the second light emitter, and
wherein the recognizer derives a direction of the traffic signal on the basis of degrees of shielding of an image area which is recognized to be occupied by the first light emitter or an image area which is recognized to be occupied by the second light emitter by the hood portion, and selects the traffic signal which the vehicle is to follow on the basis of the derived direction.

8. The traffic guide object recognition device according to claim 7, wherein the recognizer derives the degrees of shielding by the hood portion on the basis of an area ratio between right and left of the image area which is recognized to be occupied by the first light emitter or the image area which is recognized to be occupied by the second light emitter.

9. A traffic guide object recognition method causing a computer to perform:
recognizing surrounding circumstances of a vehicle;
selecting a traffic guide object which the vehicle is to follow on the basis of forms of traffic guide objects in an image captured by an imager configured to image surroundings of the vehicle out of traffic guide objects which are provided near the vehicle, wherein the traffic guide object includes a traffic signal including at least a first light emitter that emits light of a color for permitting traveling of the vehicle and a second light emitter that emits light of a color for prohibiting traveling of the vehicle;
deriving a direction of the traffic signal on the basis of an area of an image area which is recognized to be occupied by the first light emitter and an image area which is recognized to be occupied by the second light emitter when the first light emitter and the second light emitter of the traffic signal are horizontally arranged, and selecting the traffic signal which the vehicle is to follow on the basis of the derived direction; and
when a plurality of light emitters including the first light emitter and the second light emitter of the traffic signal are arranged horizontally and the area of the image area recognized to be occupied by each light emitter is decreasing in the order of the arranged light emitters from position of a light emitter with a largest area, determining that the traffic signal does not face the front of the vehicle and does not selecting the traffic signal as a signal which the vehicle is to follow.

10. A non-transitory computer-readable storage medium on which a program is stored, the program causing a computer to perform:
recognizing surrounding circumstances of a vehicle; and selecting a traffic guide object which the vehicle is to follow on the basis of forms of traffic guide objects in an image captured by an imager configured to image surroundings of the vehicle out of traffic guide objects which are provided near the vehicle, wherein the traffic guide object includes a traffic signal including at least a first light emitter that emits light of a color for permitting traveling of the vehicle and a second light emitter that emits light of a color for prohibiting traveling of the vehicle;

deriving a direction of the traffic signal on the basis of an area of an image area which is recognized to be occupied by the first light emitter and an image area which is recognized to be occupied by the second light emitter when the first light emitter and the second light emitter of the traffic signal are horizontally arranged, and selecting the traffic signal which the vehicle is to follow on the basis of the derived direction; and when a plurality of light emitters including the first light emitter and the second light emitter of the traffic signal are arranged horizontally and the area of the image area recognized to be occupied by each light emitter is decreasing in the order of the arranged light emitters from position of a light emitter with a largest area, determining that the traffic signal does not face the front of the vehicle and does not selecting the traffic signal as a signal which the vehicle is to follow.

* * * * *